Aug. 13, 1940.  F. V. DONALD  2,211,260
GARDEN TRACTOR
Filed Aug. 25, 1937  3 Sheets-Sheet 1

INVENTOR.
Forrest V. Donald
BY
ATTORNEY.

Aug. 13, 1940.   F. V. DONALD   2,211,260
GARDEN TRACTOR
Filed Aug. 25, 1937   3 Sheets-Sheet 2
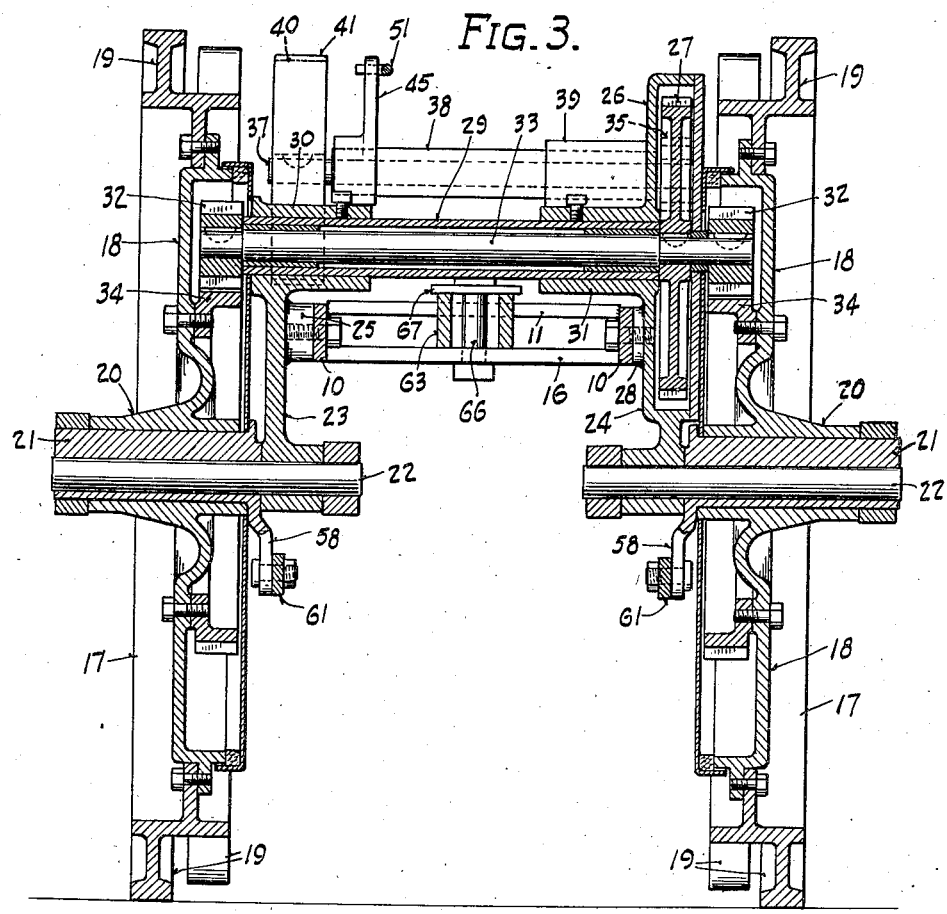
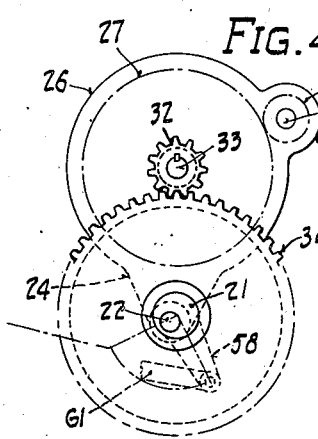
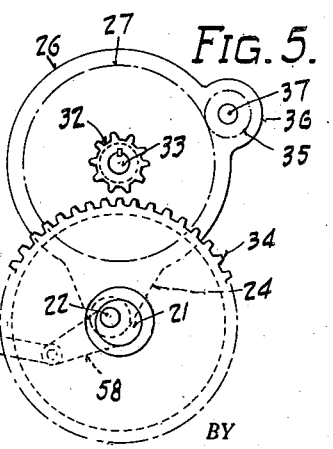
INVENTOR.
Forrest V. Donald
BY
ATTORNEY.

Aug. 13, 1940.　　　　F. V. DONALD　　　　2,211,260
GARDEN TRACTOR
Filed Aug. 25, 1937　　　3 Sheets-Sheet 3
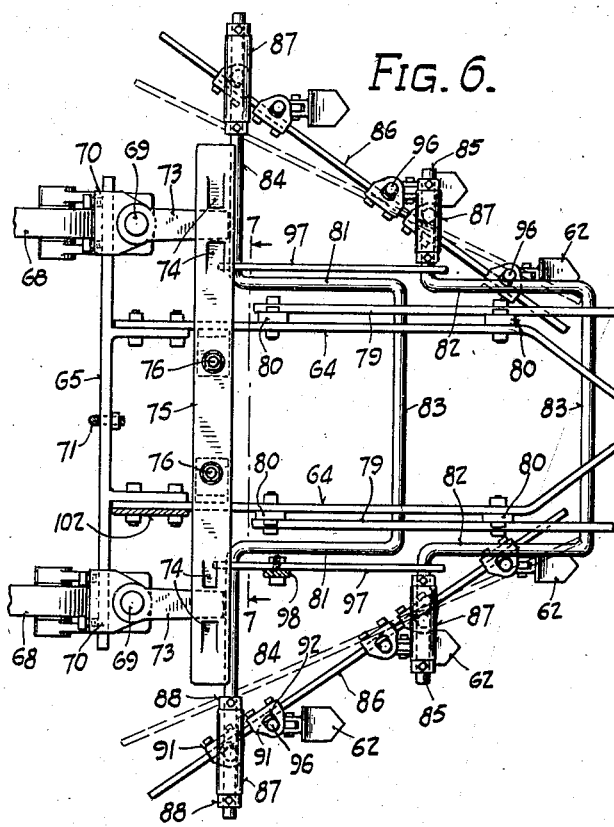
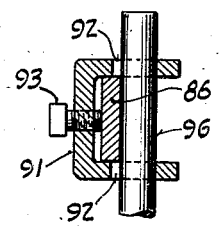
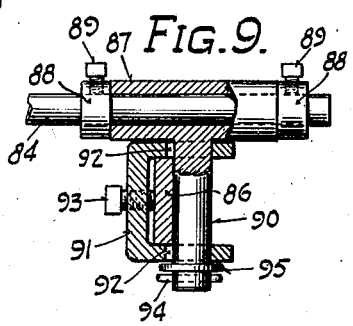
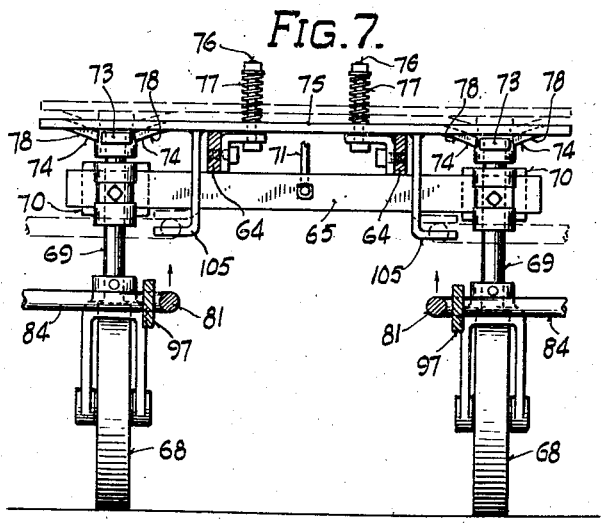
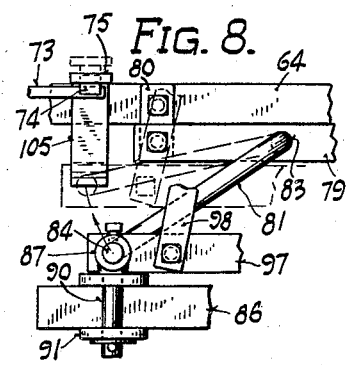
INVENTOR.
Forrest V. Donald
BY
ATTORNEY.

Patented Aug. 13, 1940

2,211,260

UNITED STATES PATENT OFFICE 2,211,260

GARDEN TRACTOR

Forrest V. Donald, Milwaukee, Wis., assignor to Donald-Boerner Corporation, Milwaukee, Wis., a corporation of Wisconsin Application August 25, 1937, Serial No. 160,741

9 Claims. (Cl. 97—48)

This invention relates to tractors primarily for use in cultivating and otherwise working gardens and the like.

One object of the present invention is to simplify and otherwise improve the construction, operation and handling of power driven garden cultivators and the like.

Another object is to provide improved means for steering garden tractors by controlling the application of driving power to the traction mechanism.

Another object is to provide an improved course-maintaining mechanism for tractors readily releasable to effect sharp turning movements.

Another object is to provide an improved course-maintaining mechanism for ground working tractors automatically releasable to permit sharp turning upon withdrawal of the ground-working tools from the soil.

Another object is to provide an improved carrier for the ground-working tools in a garden tractor, the carrier being readily adjustable to regulate and control the elevation of the tools and readily removable, as a unit, to permit ready substitution of other tools.

Another object is to provide improved mounting means for the tools of a cultivating tractor readily adjustable to regulate the spacing between tools.

Other more specific objects and advantages will appear, expressed or implied from the following description of a garden tractor constructed in accordance with the present invention.

In the accompanying drawings:

Fig. 3 is a vertical transverse sectional view on a larger scale, taken substantially along the line 3—3 of Figs. 1 and 2.

Figs. 4 and 5 are diagrammatic views illustrating the method of shifting the driving gears into and out of meshing relation in the tractor shown.

Fig. 6 is a top plan view, also on a larger scale, of the rear portion of the tractor shown in Figs. 1 and 2.

Fig. 7 is a transverse sectional view taken substantially along the line 7—7 of Fig. 6.

Fig. 8 is a fragmentary elevation illustrating a portion of the tractor shown in Fig. 6.

Fig. 9 is a sectional view on a still larger scale of a tool carrier support.

Fig. 10 is a similar view of an individual tool support.

Figure 1:
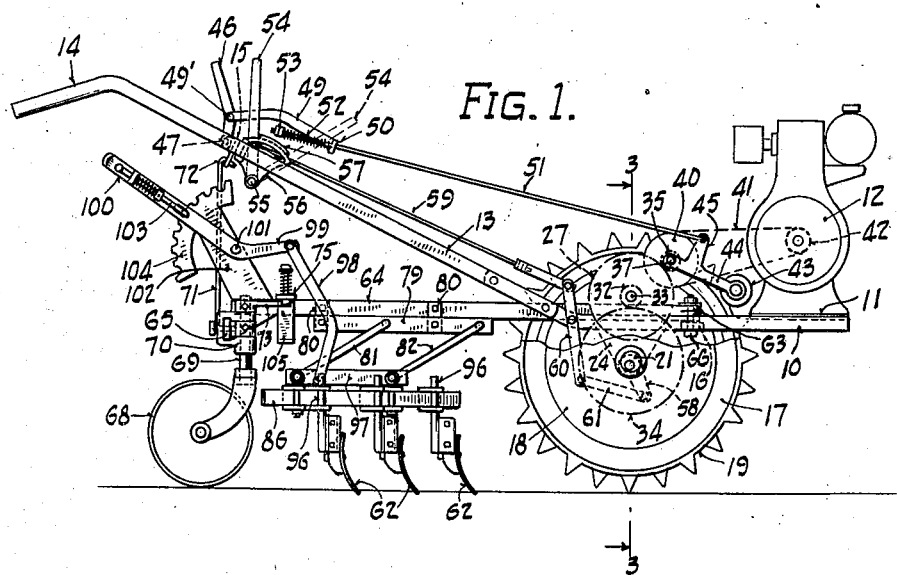
Figure 1 is a view in side elevation of a garden tractor embodying the present invention.
Figure 2:
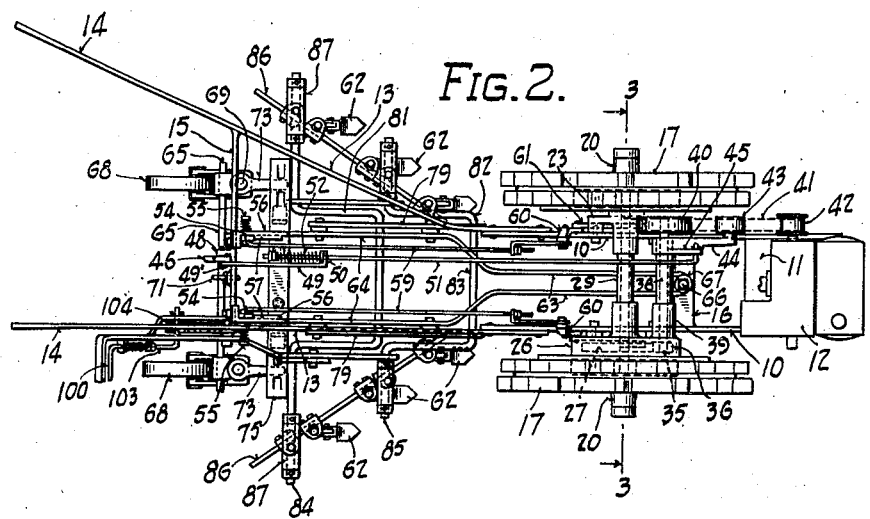
Fig. 2 is a top plan view thereof.

The garden tractor selected for illustration includes a main frame comprising spaced side bars 10, rigidly connected at their forward ends by a horizontal cross plate 11 constituting a seat or foundation for an appropriate driving motor 12, and rigidly connected at their rear ends, respectively, with the side bars 13 of a handle structure, having rearwardly extending handles 14 rigidly joined by a cross bar 15. The side bars 10 of the main frame are also joined and braced intermediate their ends by a rigid cross member 16, welded or otherwise securely fixed thereto.

The main frame 10 is supported intermediate its ends by a pair of appropriate traction wheels 17 mounted thereon preferably in a manner about to be described. Each of the wheels shown, particularly in Fig. 3, includes a central web or disk 18, having a suitable ground-gripping tread 19 removably attached to the periphery thereof, and also having an appropriate supporting hub 20 preferably formed integral therewith. In this instance the hub 20 of each wheel is journalled upon an eccentric bushing 21 fixed to stub shaft 22 journalled for support in a bracket 23 or 24 rigidly fixed to the main frame 10.

The bracket shown at 23 constitutes an upright arm having two spaced inwardly directed pads 25 bolted or otherwise fixed to one side bar 10 of the main frame, while the other bracket, shown at 24, is fashioned to form a housing 26 for a gear 27 and is provided with a similar pair of pads 28 similarly anchored to the other side bar 10 of the main frame. The brackets 23 and 24 are preferably rigidly connected by a tube 29 securely fixed within appropriate hubs 30 and 31 integral with the respective brackets and concentrically disposed with respect to the gear housing 26. The brackets 23 and 24, together with the tube 29, connected in the manner described, form a rigid yoke structure which gives additional strength and stiffness to the main frame 10.

In the tractor shown the wheels 17 are separately driven from pinions 32, fixed to the opposite ends of a shaft 33 journalled in the tube 29, and engageable with ring gears 34 fixed to the respective wheel disks 18. The shaft 33 is driven by the gear 27 fixed thereto and meshing with a pinion 35 disposed within an extension 36 of the housing 26 and fixed to rotate with a drive shaft 37. In this instance the drive shaft 37 is journalled for support in a rigid tube 38 securely anchored at one end in an extended hub portion 39 formed integral with the extension 36 of the gear housing. A pulley 40, fixed to the projecting end of the shaft 37, is drivable through a belt 41 from a pulley 42 on the motor 12, under the control of an appropriate belt tightener which is controllable preferably by means conveniently arranged near the handles 14 of the tractor.

The belt tightener shown comprises a belt engaging roller 43 carried by an arm 44 rockably mounted on the shaft 37 and having an actuating arm 45 suitably connected to an appropriate control lever 46 rockably mounted, as at 47, upon a bracket 48 projecting rearwardly from the cross bar 15 of the handle structure. In this instance a link 49, pivotally connected at 49' with the lever 46, has one end 50 bent and perforated to receive a pull rod 51 connected to the arm 45, a compression spring 52 being interposed between the bent end 50 of the link and a nut 53 on the rod 51 to tension and actuate the latter when the lever 46 is swung rearwardly.

The arrangement is such that the roller 43 is actuated to press upon and tension the belt 41 and thereby effect driving of the pulley 40 whenever the lever 46 is forced rearwardly and downwardly, the downward swing of the lever 46 being limited by engagement of the link 49 against the handle cross bar 15, in which position the pivoted end 49' of the link has swung about the center 47 through a dead-center position and the lever 46 and link normally remains in that position until released.

It is of course understood that when the belt 41 is thus tightened by the roller 43, the pulley 40 is continuously driven, causing a continuous operation of the shaft 33 and pinions 32 by power transmitted thereto through the shaft 37, pinion 35, and gear 27, so that when both pinions 32 are engaged with the ring gears 34, as indicated in Fig. 3, the traction wheels 17 are both driven at equal speeds and the tractor advances along a straight course.

For steering purposes, provision is made for selectively disconnecting one or the other of the traction wheels 17 from the source of driving power, so that all of the power is transmitted to one of the traction wheels only, thereby causing the tractor to turn from a straight course. In the tractor shown, this is accomplished by the use of separate control levers 54 conveniently arranged on the handle structure and each connected to rock one of the eccentric bushings 21 in a manner to withdraw either of the pinions 32 from its mating ring gear 34.

In this instance, each lever 54 is rockably supported upon a spring tensioned pivot pin 55 in a quadrant 56 fixed to the handle cross bar 15, each quadrant having a flanged section 57 adapted to releasably hold the coacting lever 54 in either the full-line or dotted-line position shown in Fig. 1. Each lever 54 is connected to an arm 58 depending from one of the bushings 21 through appropriate operating connections, such as a link 59, lever 60, and link 61, so that when both levers 54 are in the upright full-line positions shown, both bushings 21 assume the position shown in Fig. 4 and both ring gears 34 engage with their respective pinions 32. However, when either lever 54 is tilted forwardly into the dotted-line position of Fig. 1, its corresponding eccentric 21 is thereby rocked into the position shown in Fig. 5, causing separation of the corresponding ring gear 34 and pinion 32.

The tractor shown is equipped to carry and operate soil-working tools of various types, such as the cultivator blades shown at 62. For this purpose a trailing auxiliary frame is provided which in this instance comprises a steel bar bent upon itself intermediate its ends to provide a relatively narrow, tongue-like, forward section 63, and further bent to provide a somewhat wider rear body section 64. The rear end of the body section 64 is braced by a cross bar 65 rigidly secured thereto.

The forward end of the tongue-like section 63 of the auxiliary frame is supported by the cross member 16 of the main frame 10 to which it is clamped by a bolt 66 which extends vertically through the member 16 and a coacting clamp washer 67. The body section 64 of the auxiliary frame is supported by a pair of laterally spaced caster wheels 68, each mounted to swing about the vertical axis of its supporting shaft 69, journalled in an appropriate bracket 70 clamped to the rear cross bar 65 of the auxiliary frame. The handle structure 13 is flexibly connected to the rear end of the auxiliary frame through a vertical prop-like link 71 attached at its lower end to the cross bar 65 of the auxiliary frame and hooked at its upper end 72 to the cross bar 15 of the handle structure.

Both caster wheels 68 are preferably normally locked against swinging and for that purpose the mounting shaft 69 of each is provided with a control arm 73, fixed to the upper end of the shaft and extending forwardly therefrom. The forward end of each arm 73 is normally engaged between a pair of detents 74 on a transverse lock bar 75 mounted on the body section 64 of the auxiliary frame. In this instance the lock bar 75 is connected to the body 64 through a pair of bolts 76, tensioned by springs 77 which yieldably retain the bar 75 in its lower locking position. The detents 74 are shaped to provide cam surfaces 78 for coaction with the caster control arms 73 in a manner to automatically lift the lock bar 75 and thereby permit swinging movement of the control arms into the locking positions shown. When thus locked, the caster wheels 68 coact with the ground to steady the body frame 64 against side sway.

The several cultivator blades or tools 62 constitute parts of an assembly which is attached to and removable, as a unit, from the body frame 64. The assembly shown will now be described. It comprises a pair of longitudinal mounting bars 79, each bolted in horizontal position to a pair of supporting plates 80 which are bolted to the frame 64. Two pairs of rearwardly inclined parallel links 81 and 82, respectively suspended from integral cross shafts 83 rockable in the bars 79, carry outwardly extended horizontal arms 84 and 85 at their lower ends. The arms 84 support the rear ends of a pair of horizontal, diagonal, tool-carrier bars 86 through appropriate hangers 87, such as shown in detail in Fig. 9, the forward ends of the bars 86 being similarly supported by the arms 85.

Each of the hangers is in the form of a sleeve 87 loosely mounted on one of the arms 84 or 85 and confined between adjustable collars 88 releasably fixed to the arm by set screws 89. Each sleeve carries a depending integral pin 90 releasably clamped to the adjacent tool-carrier bar 86 by an appropriate clamp 91. In this instance the clamp 91 is U-shaped to embrace the bar 86 and is provided with tapered or ovate openings 92 through which the pin 90 extends and by which the pin 90 is securely gripped under the clamping pressure of a screw 93 carried by the clamp and arranged to force the bar 86 against the pin 90. Appropriate means, such as a cotter pin 94 and washer 95 on each pin 81, prevents accidental withdrawal of the clamp 91 from the pin 90 when the clamp screw 93 is released.

Each bar 86 carries a plurality of tools 62 each adjustably fixed thereto by a clamp 91 which is a duplicate of the clamp just described. In this instance the clamp 91 is arranged to securely clamp the upstanding stem 96 of a tool 62 against the bar 86 with the stem 96 securely gripped by the ovate openings 92 in the clamp (Fig. 10).

From the foregoing it will be noted that each of the plurality of tools 62 carried by either of the bars 86 may be adjustably fixed at any desired point along the bar, and that the angular setting of each bar 86 may be readily adjusted by adjustment of either of the supporting sleeves 87 lengthwise of its supporting arm 81 or 82, so that the spacing and spread of the tools may be readily adjusted as conditions may require.

The entire gang of tools 62 may be readily raised or lowered at will by appropriate mechanism, such for instance as will now be described. In this instance, each arm 84 is connected to the adjacent arm 85 through a horizontal link 97, the links 97 being parallel to the upper mounting bars 79 and functioning to maintain the depending inclined links 81 and 82 substantially parallel and to maintain the points of the several tools 62 substantially in a common horizontal plane. The elevation of the tools 62 is regulated and controlled by a supporting link 98, bolted or otherwise releasably connected to one of the horizontal links 97, and supported by one arm 99 of an actuating lever 10. The lever 100 is shown rockably supported at 101 upon an upstanding bracket 102 rigidly fixed to the body frame 64. A manually controlled pawl 103 on the lever 100 coacts with a toothed quadrant 104 on the bracket 102 to releasably sustain the lever 100 in any of its several positions of adjustment.

The arrangement is such that by movement of the lever 100 the several tools 62 may be raised or lowered, at will, through an arc determined by the inclined links 81 and 82, the common plane of the tips of the tools remaining substantially horizontal and their stems 96 remaining substantially vertical in all positions of the tools.

Provision is preferably made for releasing the casters 68 so as to permit them to swing freely and thus to follow freely in executing short or abrupt turning movements of the tractor, and for rending such release automatic whenever the tools 62 are elevated clear of the ground. Mechanism for this purpose is illustrated particularly in Figs. 6, 7, and 8. It includes two thrust members 105 which extend downwardly into the range of movement of the lower ends of the links 81. The arrangement is such that, as the links 81 swing upwardly to raise the tools 62 from the ground, the lower ends of those links strike the members 105 and thereby lift the lock bar 75, with its detents 74, clear of the caster control arms 73, so as to free the arms 73 and thus permit the casters 68 to swing freely.

During normal operation, both traction wheels 17 are power driven from the motor 12 and tensioned belt 41 through the pinions 32, the caster wheels 68 being locked in the positions shown by the lock bar 75, so that the tractor travels along a substantially straight course with the blades 62 engaging the soil to a depth dependent upon the adjusted position of the lever 100. While thus traveling, the tractor may be swerved toward the right or left by forcing the handles 14 to the left or right, the connections between the auxiliary frame 64 and the main frame 10, though stiff, being sufficiently yieldable to effect such steering movements.

To effect a sharp turn to the right or left, the handle 100 is first depressed to elevate the blades 63 from the soil and to also elevate the lock bar 75 to release the caster wheels 68 in the manner above described, whereupon one or the other of the levers 54 is shifted into the dotted line position of Fig. 1 to disengage one of the pinions 32 from its mating gear 34 (Fig. 3). With the right hand traction wheel 17 thus released, and with the caster wheels 68 free to swing, all of the driving power is transmitted to the left hand traction wheel, so that the tractor may then turn toward the right substantially about the right hand driving wheel as a center; and with the left hand traction wheel released, a similar sharp turn may be made toward the left under the power applied to the right hand traction wheel.

Various changes may be made in the embodiments of the invention hereinabove specifically described without departing from or sacrificing the advantages of the invention as defined in the appended claims.

I claim:

1. In a garden tractor having a frame, and a motor carried thereby, the combination of a pair of traction devices at opposite sides of said frame, a pair of gears each connected to drive one of said devices, a pair of pinions driven from said motor, each pinion being arranged to coact with one of said gears, and means moveable to separately disengage either of said pinions from its coacting gear.

2. In a tractor the combination of a frame, a pair of traction devices at opposite sides of said frame, a separate driving gear for each of said devices, a pair of power driven pinions each arranged to coact with one of said gears, and means including separately movable eccentrics each operable to effect engagement or disengagement between one of said pinions and its coacting gear.

3. In a tractor the combination of a frame, a pair of traction wheels at opposite sides of said frame, a driving gear carried by each of said wheels, a pair of power driven pinions carried by said frame, each of said pinions being arranged to coact with one of said gears, and a separate eccentric mounting for each of said wheels independently adjustable to effect engagement or disengagement between either of said pinions and its coacting gear.

4. In a tractor the combination of a frame, a power driven shaft extending transversely of said frame, pinions fixed to the opposite ends of said shaft, a pair of eccentrics mounted at opposite sides of said frame, a pair of traction wheels each journalled on one of said eccentrics, and a gear on each of said wheels for coaction with one of said pinions, said eccentrics being independently rockable to effect engagement or disengagement between either of said pinions and its coacting gear.

5. In a tractor the combination of a frame having a rearwardly extending handle structure, a pair of laterally spaced traction wheels supporting the forward end of said frame, caster wheel mechanism for supporting the rear end of said frame, said mechanism including caster control arms affixed to swing with each caster wheel, power driven means for driving said traction wheels to thereby propel the tractor, locking means for coaction with said mechanism to hold the tractor to its course, said locking means including a transverse bar having detents arranged to receive said caster control arms to thereby hold the same against swinging movement, and means operable to connect said power driven means to one or the other of said traction wheels to turn the tractor from its course, said transverse bar being raisable to release said detents from said caster control arms to thereby facilitate turning movement of the tractor.

6. In a tractor the combination of a frame, a pair of laterally spaced traction devices supporting one end of said frame, power driven means for driving said devices to thereby propel the tractor, caster wheel mechanism supporting the other end of said frame, said mechanism including caster control arms affixed to swing with each caster wheel, means for locking said mechanism against swinging to thereby hold the tractor to its course, said locking means including a transverse bar having detents arranged to receive said caster control arms to thereby hold the same against swinging movement, said transverse bar being raisable to release said detents from said caster control arms to thereby permit the tractor to turn from its course, and means operable to connect said driving means to one or the other of said traction devices to effect turning movement of the tractor.

7. In a tractor the combination of a frame, a pair of laterally spaced traction devices supporting one end of said frame, power driven means for driving said devices to thereby propel the tractor, caster wheel mechanism supporting the other end of said frame, said mechanism including caster control arms affixed to swing with each caster wheel, means normally locking said mechanism against swinging to thereby normally hold the tractor to its course, said locking means including a transverse bar having detents arranged to receive said caster control arms to thereby hold the same against swinging movement, ground-working means carried by said frame, means for elevating and lowering said ground-working means, and means responsive to said last named means for automatically raising said transverse bar upon elevating said ground-working means.

8. In a tractor the combination of a frame, power driven traction means supporting one end of said frame, caster wheel mechanism supporting the other end of said frame including a caster control arm fixed to swing with each caster wheel, a transverse bar having detents normally coacting with each control arm and locking said mechanism against swinging to thereby normally hold the tractor to its course, ground working means carried by said tractor, means including a plurality of parallel link structures for suspending said ground-working means for said frame, means for rocking said link structures to thereby raise and lower said ground working means, said ground working means including a portion acting on said transverse bar to raise said bar upon elevation of said ground working means to thereby release said control arms from said detents.

9. In a tractor the combination of a frame, power driven traction means supporting one end of said frame, mechanism including a caster wheel supporting the other end of said frame, a control arm fixed to swing with said caster wheel, a transverse bar having detents adapted to automatically receive and lock said control arm upon swinging of said arm into a predetermined wheel position, ground working means carried by said frame, and means for elevating and lowering said ground working means, said ground working means including a portion acting on said transverse bar upon elevation of said ground working means to thereby raise said bar and release said control arm from said detents.

FORREST V. DONALD.